United States Patent [19]
Hobson

[11] Patent Number: 6,122,748
[45] Date of Patent: Sep. 19, 2000

[54] CONTROL OF COMPUTER SYSTEM WAKE/SLEEP TRANSITIONS

[75] Inventor: Louis B. Hobson, Tomball, Tex.

[73] Assignee: Compaq Computer Corporation, Houston, Tex.

[21] Appl. No.: 09/052,439

[22] Filed: Mar. 31, 1998

[51] Int. Cl.[7] ................................................ G06F 1/26
[52] U.S. Cl. .............................. 713/323; 710/8; 710/104
[58] Field of Search .................................... 713/300, 320, 713/323, 324; 710/8, 10, 104

[56] References Cited

U.S. PATENT DOCUMENTS

| 5,919,264 | 7/1999 | Reneris ..................................... 713/324 |
| 5,944,831 | 8/1999 | Pate et al. ................................. 713/324 |
| 5,983,353 | 11/1999 | MeHann, Jr. ............................ 713/310 |

OTHER PUBLICATIONS

Intel/Microsoft/Toshiba, "Advanced Configuration and Power Specification", Revision 1.0, Dec. 22, 1996.

*Advanced Configuration and Power Interface Specifcation*, Intel/Microsoft/Toshiba, Revision 1.0, Dec. 22, 1996.

*Primary Examiner*—Glenn A. Auve
*Attorney, Agent, or Firm*—Conley, Rose & Tayon, P.C.; Michael F. Heim; Jonathan M. Harris

[57] ABSTRACT

A method to configure a device for remote management that is transparent to an advanced configuration and power interface (ACPI) operating system is described. The method includes configuring a device in a computer system when a transition between power states is being effected by the advanced configuration and power interface operating system including the step of causing the computer system to enter a non-ACPI mode in response to the transition being effected, configuring the device while in the non-ACPI mode, and completing the transition after the configuring of the device. The method may be stored in any media that is readable and executable by a computer system.

47 Claims, 6 Drawing Sheets

CONTROL OF COMPUTER SYSTEM WAKE/SLEEP TRANSITIONS

BACKGROUND

The invention relates to controlling the sleep-to-wake and wake-to-sleep state transitions in a computer system executing an advanced configuration and power interface (ACPI) operating system.

Known power management techniques such as advanced power management (APM) are implemented by basic input-output system (BIOS) instructions stored in read-only memory. The BIOS, through operating system transparent system management interrupts (SMIs), monitored power managed devices and notified the operating system when it was time to put the system to sleep. The operating system, in turn, would notify its device drivers of the impending power state change so they could perform an orderly shutdown of their respective devices. Following device driver operations, control was returned to the BIOS which then performed any hardware specific duties necessary to put the system to sleep. In waking from a sleep state, the system BIOS would first receive control so that it could configure system hardware for returning the system to a working state. Only after the BIOS had performed its configuration tasks was control returned to the operating system.

Under the newer ACPI, when a power management or configuration event occurs the operating system is notified via an operating system visible interrupt known as a system control interrupt (SCI). It is the operating system itself that directs all system and device power state transitions.

The ACPI specification includes tables, BIOS, and hardware registers. (See the "Advanced Configuration and Power Interface Specification" dated Dec. 22, 1996.) ACPI tables are used to describe system information (e.g., supported power states, power sources, clock sources), features (e.g., available hardware devices), and methods for controlling those features (e.g., ACPI control methods). ACPI BIOS is that part of the computer system firmware that implements the ACPI specified interfaces for sleep, wake, and some restart operations, and provides permanent storage of ACPI table information. ACPI registers are used to store and pass event information between the hardware/firmware and an ACPI driver—an operating system level program that directs and coordinates all transitions between working and sleeping states.

The ACPI specification defines a global working state (G0) as that state in which a host processor dispatches and executes user mode (application) threads. In this state, devices (peripherals) may dynamically have their power state changed. The ACPI specification defines a global sleeping state (G1) as that state in which no user mode threads are executed by the host processor. As shown in Table 1, the ACPI specification also defines five types of sleeping states (S1 through S5).

TABLE 1

| \_\_\_\_\_\_\_\_\_\_\_\_ACPI Sleep States\_\_\_\_\_\_\_\_\_\_\_\_ | |
|---|---|
| Type | Description |
| S1 | Low wake-up latency state. No system context is lost and hardware maintains all system context. |
| S2 | Similar to S1 except that the operating system is not responsible for maintaining processor or cache context. |
| S3 | Processor and cache context are lost. Hardware maintains memory and some processor configuration context. |
| S4 | It is assumed that hardware has powered off all devices, although platform context is maintained. |
| S5 | Soft off state. Similar to S4 except that no context is saved and no device is enabled to wake the system. A complete boot operation is required to exit the S5 state. |

In ACPI terminology, the working state is also referred to as the S0 state. Thus, Sx notation can indicate any possible state, from working (S0) to any type of sleep state (S1 through S5).

Figure 1:
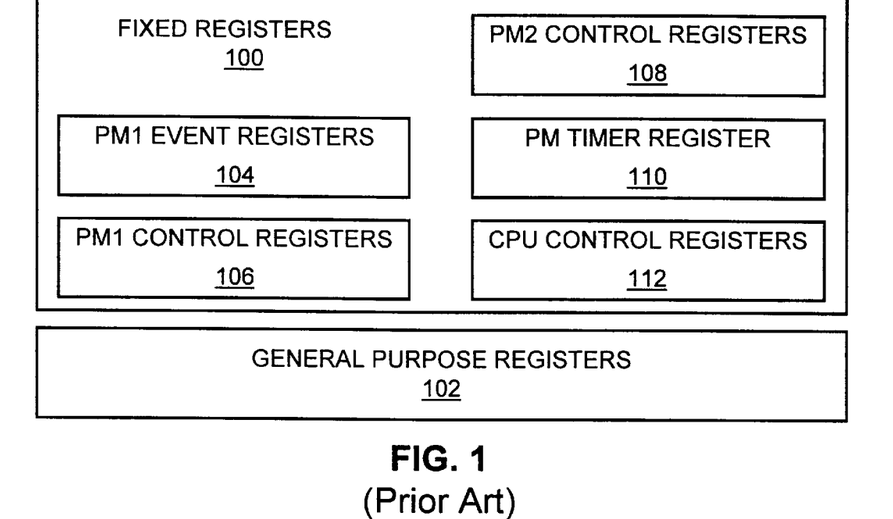
FIG. 1 shows advanced configuration and power interface (ACPI) register space.

Referring to FIG. 1, ACPI registers include fixed 100 and general purpose 102 registers. Fixed registers 100 are required in every ACPI-compatible system and are used to implement ACPI event handing, e.g., transitions to and from the working and sleeping states. General purpose registers 102 are used to process events generated by value-added hardware, e.g., original equipment manufacturer (OEM) supplied components. As shown, ACPI fixed register space includes power management one (PM1) event registers 104, PM1 control registers 106, a power management two (PM2) control register 108, a power management (PM) timer register 110, and processor or PU control registers 112.

Figure 2:
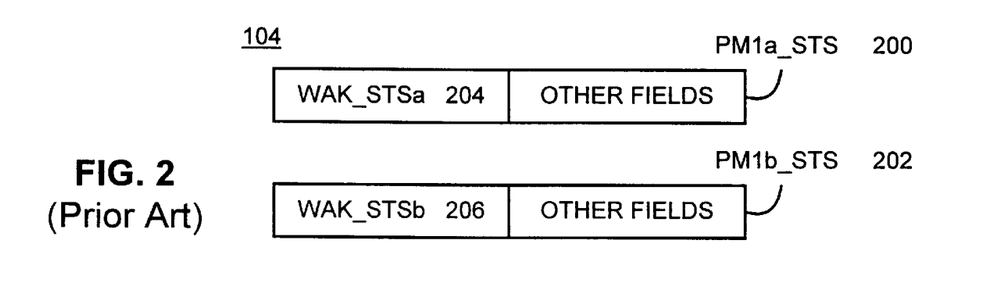
FIG. 2 shows ACPI event registers.
Figure 3:
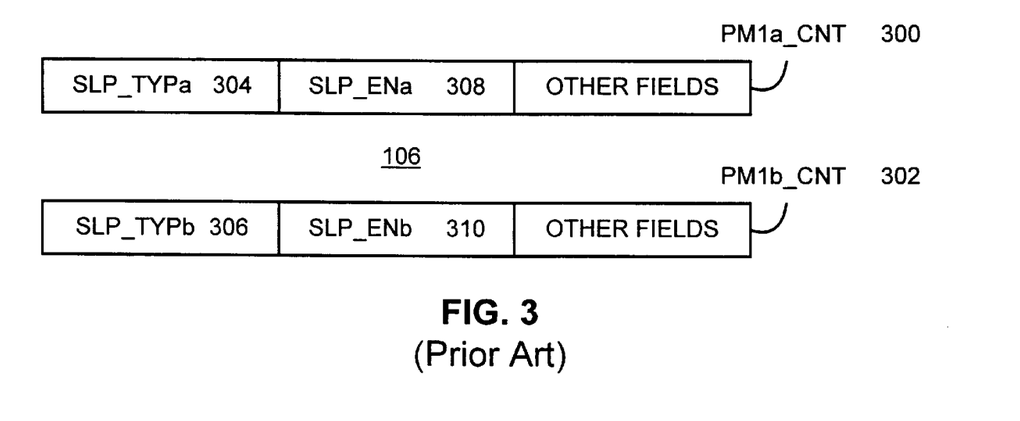
FIG. 3 shows ACPI control registers.

Transitions between the global working state and any one of the supported sleeping states are controlled by fields in PM1 event and control registers, 104 and 106 respectively. Referring to FIG. 2, PM1 event registers 104 include an 'a' status register (PM1a_STS 200) and a 'b' status register (PM1b_STS 202). Each status register includes a wake status field, WAK_STSa 204 and WAK_STSb 206. Referring to FIG. 3, PM1 control registers 106 include an 'a' control register (PM1a_CNT 300) and a 'b' control register (PM1b_CNT 302). Each control register includes a sleep type field (304 and 306) and a sleep enable field (308 and 310). To transition from the S0 working state to the S3 sleep state, for example, the ACPI driver stores the desired sleep state identifier (i.e., S3) first into SLP_TYPa field 304 and then into SLP_TYPb field 306. Later, when the ACPI driver sets either sleep enable field (308 or 310), the computer system transitions into the S3 sleep state. While in a sleeping state, any enabled wake-up event/device may set the wake status field (204 or 206). When one of the wake status fields is set, a SCI is generated which allows the ACPI driver to sequence the computer system hardware back to the working state.

Some devices, such as network interface cards (NICs) and modems, are not capable of responding to ACPI wake-up signals. These devices are typically designed to be controlled and configured through BIOS and do not respond to sleep and wake commands issued in accordance with the ACPI specification.

SUMMARY

In one aspect, the invention provides a method to configure a device for remote management that is transparent to an advanced configuration and power interface (ACPI) operating system. The method includes configuring a device in a computer system when a transition between power states is being effected by an advanced configuration and power interface operating system and includes the steps of causing the computer system to enter a non-ACPI mode in response to the transition being effected, configuring the device while in the non-ACPI mode, and completing the transition after the configuring of the device. The method may be stored in any media that is readable and executable by a computer system. The device can be any device capable of being remotely managed, e.g., a network interface card, a modem, a printer control card.

In another aspect, the invention provides a computer system having a bus, a host processor, an input-output device, and a memory operatively interconnected. The memory including instructions to transition the computer system between power states when effected by an advanced configuration and power interface operating system.

DETAILED DESCRIPTION

Figure 4:
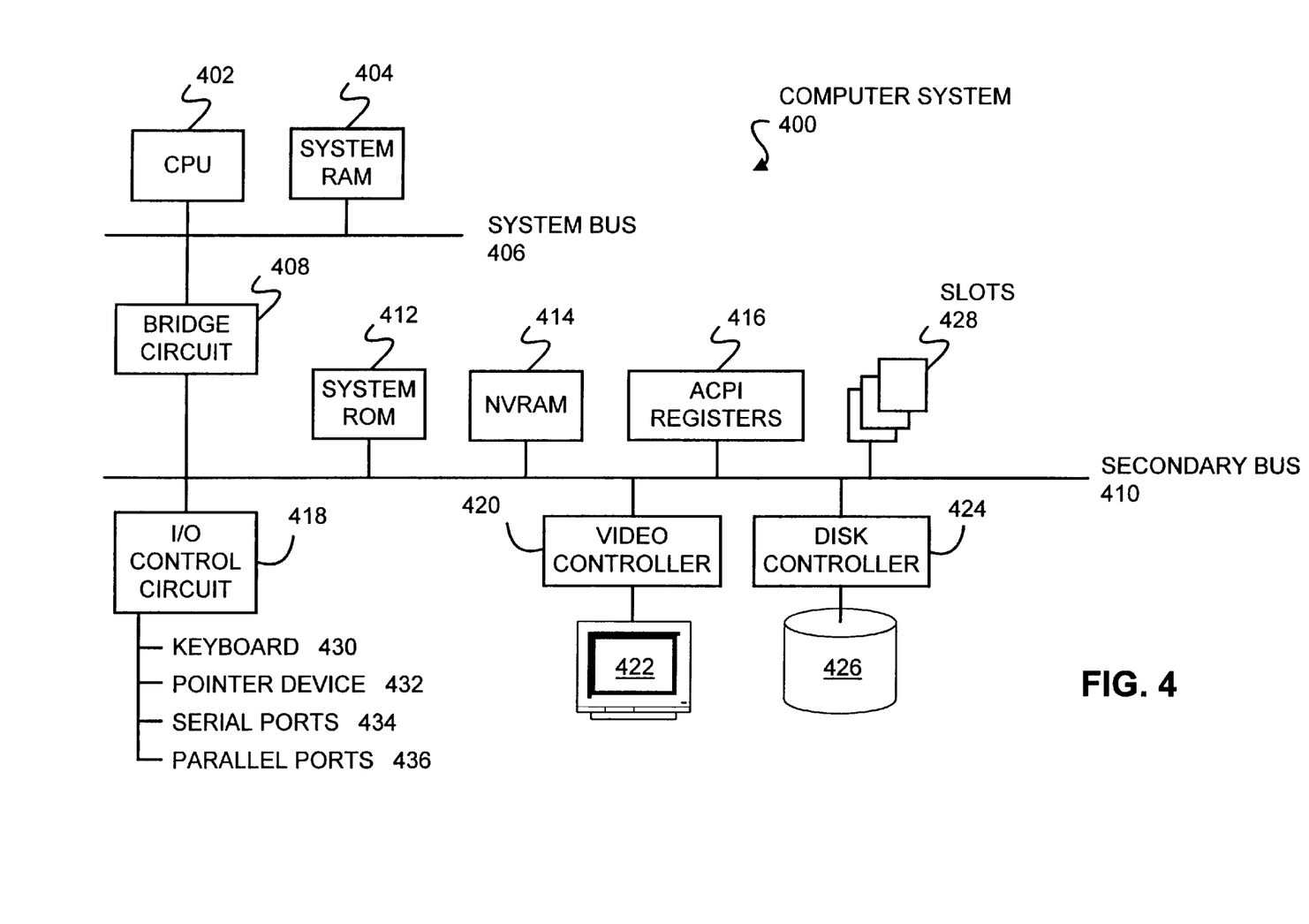
FIG. 4 shows a computer system.

Referring to FIG. 4, an advanced configuration and power interface (ACPI) computer system 400 providing basic input-output system (BIOS) control of work-sleep state transitions includes host processor (PU) 402 and random access memory (RAM) 404 coupled to system bus 406. Illustrative host processors 402 include the PENTIUM, PENTIUM PRO, PENTIUM-II, and 80X86 families of processors from Intel Corporation.

Bridge circuit 408 couples system bus 406 to secondary bus 410. Components coupled to secondary bus 410 include: system read only memory (ROM) 412; non-volatile RAM (NVRAM) 414; ACPI registers 416; input-output (I/O) control circuit 418; video controller 420 and associated display 422; disk controller 424 and associated disks (one shown) 426; and one or more expansion slots 428. Expansion slots 428 can, for example, be used to include a network interface card (NIC), modem, or printer control card. Input-output control circuit 418 can provide an interface for user keyboard 430, pointer device 432, and serial 434 and parallel 436 ports.

ACPI registers 416 (see also FIGS. 1 through 3) may be incorporated within bridge circuit 408, or some ACPI registers (e.g., PM1a_STS 200 and PM1a_CNT 300) may be in one location such as bridge circuit 408, and other ACPI registers (e.g., PM1b_STS 202 and PM1b_CNT 302) may be in another location such as an application specific integrated circuit (ASIC) connected to secondary 410 bus via an expansion slot 428.

Figure 5:
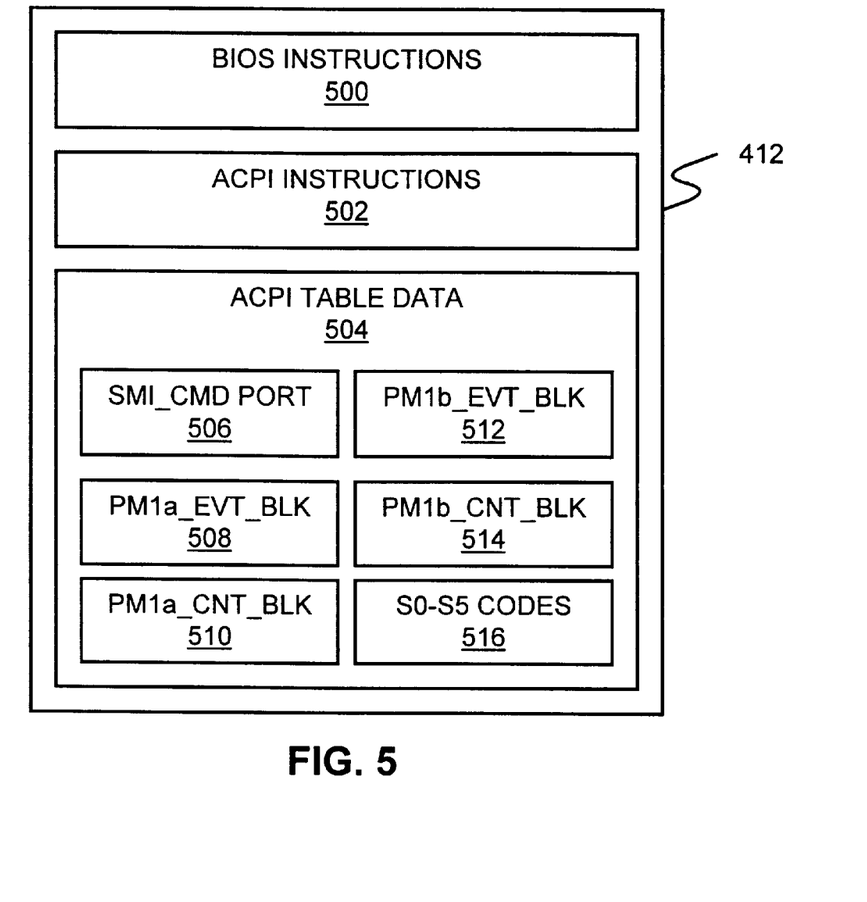
FIG. 5 shows system read only memory.

On computer system 400 power-up, host processor 402 begins executing BIOS instructions to initialize memory, test and initialize system components, and bootstrap the operating system. Referring to FIG. 5, BIOS instructions 500 can be stored in system ROM 412 which can also include ACPI instructions 502 and ACPI table data 504. One aspect of system 400 start-up includes loading ACPI table data 504 into system RAM 404. As described above, ACPI table data 504 provides an ACPI operating system with information such as supported power and sleep states, available hardware devices, and methods for controlling those devices.

ACPI table data includes a number of system level addresses such as SMI_CMD port 506, PM1a_EVT_BLK 508, PM1a_CNT_BLK 510, PM1b_EVT_BLK 512, and PM1b_CNT_BLK 514. ACPI table data also includes system operational codes 516 for each supported states, S0 through S5. When the operating system writes to the SMI_CMD 506 address, computer system 400 is placed into the system management mode (SMM), forcing the system to operate using legacy (i.e., non-ACPI) system management interrupts and relinquishing control to BIOS program code. The PM1a_EVT_BLK address 508 specifies the address of the PM1a status register 200, the PM1a_CNT_BLK address 510 specifies the address of the PM1a control register 300, the PM1b_EVT_BLK address 512 specifies the address of the PM2a status register 202, and the PM1b_CNT BLK address 514 specifies the address of the PM1b control register 302.

Figure 6:
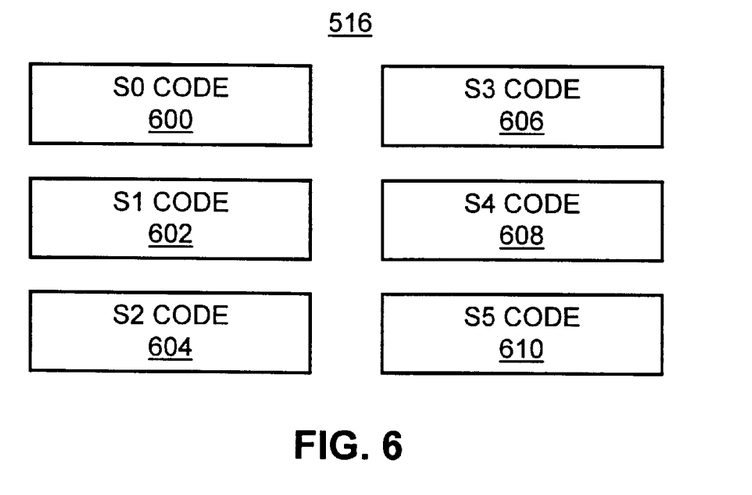
FIG. 6 shows that part of ACPI table data relating to system operational codes.

Referring to FIG. 6, operational codes 516 specify the system defined code for each of six different possible processing state, S0 through S5 (600 through 610 respectively), where each state is defined for both the PM1a and PM1b registers. That is, S1code 602 includes a PM1a code for the S1 state and a PM1b code for the S1 state. The values contained in 600 through 610 are the values written to SLP_TYPa 304 and SLP_TYPb 306 fields of the PM1a_CNT 300 and PM1b_CNT 302 registers as the ACPI operating system prepares to transition computer system 400 from one power state (e.g., working state S0) to another (e.g., sleep state S3).

Figure 7:
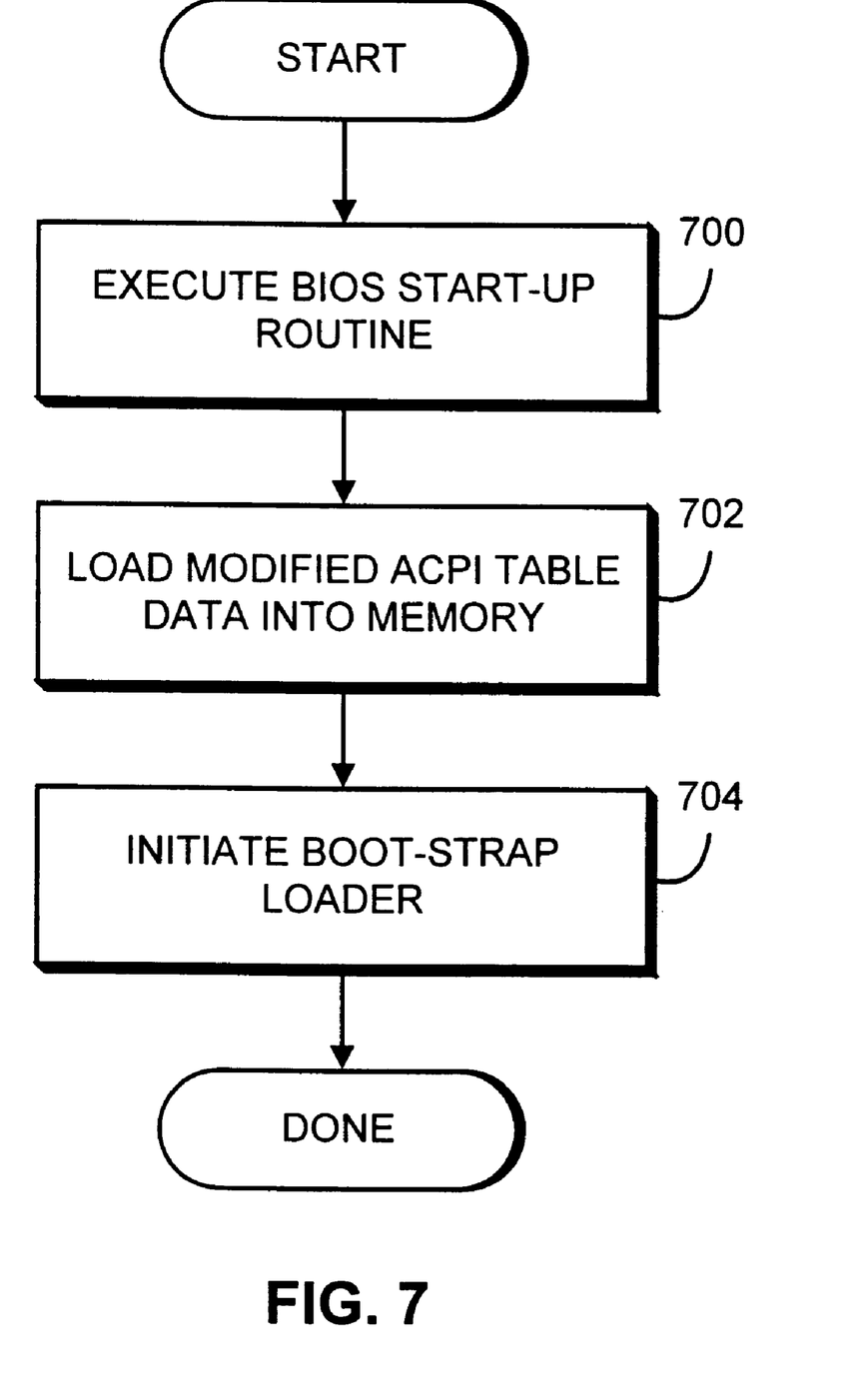
FIG. 7 shows a system power-up process.

In FIG. 7, start-up processing begins in a conventional manner with execution of a BIOS power-on system test (POST) routine at step 700. Next, BIOS loads into system RAM 404 modified ACPI table data (step 702) for later use by the ACPI operating system. The last step taken during start-up is to initiate a boot-strap loader (step 704). The boot-strap loader searches for an operating system on disk 426 (e.g., floppy, fixed, optical) at a specified location. If the operating system's boot record is found, it is loaded into system RAM 404 and given control of computer system 400.

Figure 8:
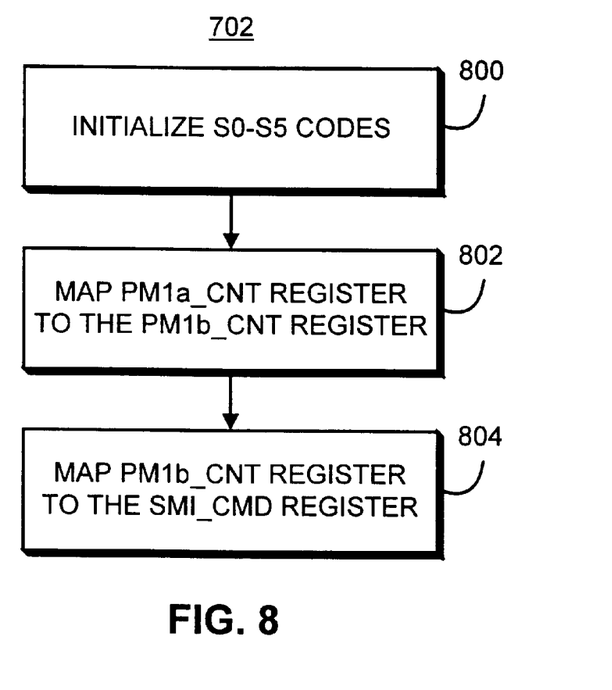
FIG. 8 shows a process for loading ACPI table data during system power-up.

FIG. 8 shows a process for loading ACPI table data during system power-up (step 702 in FIG. 7). System operational codes S0 through S5 (elements 600 through 610 in FIG. 6) are initialized at step 800 such that all codes for the PM1a register set correspond to the S0 or working state. Operational codes for the PM1b register set are specified as normal; each state having a unique identifier. Step 800 ensures that no matter what sleep type code is written to the PM1a_CNT 300 register's SLP_TYPa 304 field, the system remains in the working state. In step 802, the address for the PM1a_CNT register 300 (i.e., PM1a_CNT_BLK 510) is changed to be that of the PM1b_CNT register 302 (i.e., PM1b_CNT_BLK 514). Step 802 ensures that when the ACPI operating system attempts to write to the PM1a_CNT register it will, in fact, write to the PM1b_CNT register. In step 804, the address of the PM1b_CNT register 302 (PM1b_CNT_BLK 514) is changed to that of the SMI command port (SMI_CMD 506). Step 804 ensures that when the ACPI operating system writes to SM1b_CNT register 302, computer system 400 is placed into the system management mode.

Figure 9:
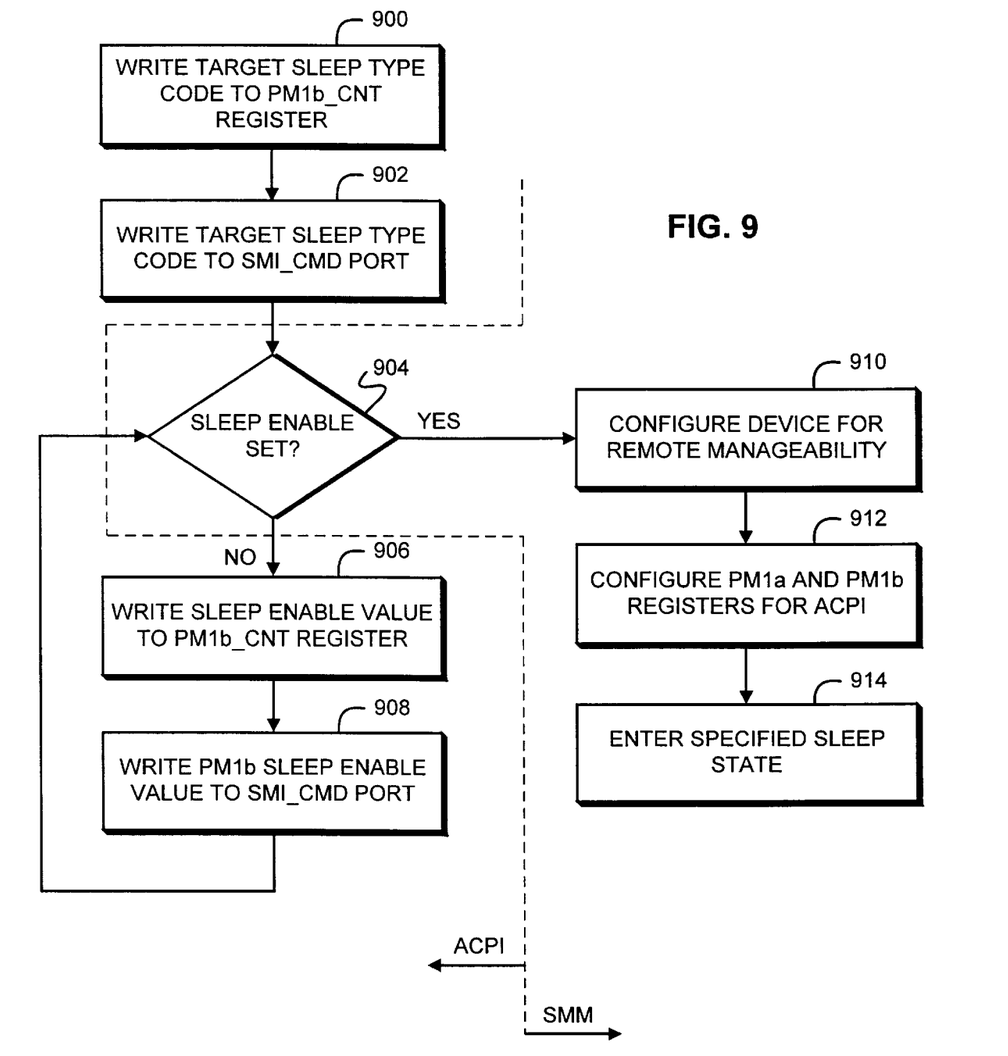
FIG. 9 shows a wake-to-sleep state transition method.

Once start-up operations are complete (i.e., steps 700 through 704 of FIG. 7), computer system 400 performs in a conventional manner until the operating system initiates a transition from a working state to a sleep state. FIG. 9 shows a process that only places a device into its remote operational state (e.g., capable of responding to remote wake-up and/or control signals) immediately prior to computer system 400 entering a sleep state.

By way of example, consider what happens when computer system 400 is to be switched from the S0 working state to the S3 sleeping state. First, the ACPI operating system (i.e., the ACPI driver) attempts to write the S3 sleep state code 606 into the SLP_TYPa field of the PM1a_CNT register. However, because modified ACPI table data was loaded in accordance with FIGS. 7 and 8, the ACPI driver actually writes a S0 code 600 into the SLP_TYPb 306 field of PM1b_CNT register 302 (step 900). The ACPI driver then attempts to write the S3 sleep state code 606 into the SLP_TYPb field of the PM1b_CNT register. However, because modified ACPI table data was loaded at start-up, the ACPI driver actually writes the S3 sleep code to the SMI_CMD port (step 902). Writing to the SMI command port causes computer system 400 to enter the system management mode (SMM), whereby system BIOS gains operational control. If BIOS determines that the data written to the SMI command port does not correspond to a set sleep enable field (the 'no' prong of step 904), BIOS returns control to the ACPI operating system—SMM is exited and ACPI mode is reentered.

The ACPI operating system continues by attempting to set the sleep enable field of the PM1a_CNT register. Because of the modified ACPI table data, however, the SLP_ENb field 310 of the PM1b_CNT register 302 is set instead. This action has no effect however, because the specified sleep state (in PM1b_CNT register 302) is $S_0$ (step 906). Next, the ACPI driver attempts to set the sleep enable field of the PM1b_CNT register which, for the reasons described above, writes the sleep enable bit pattern into the SMI command port (step 908). This time BIOS detects that the sleep enable bit is set (the 'yes' prong of step 904). BIOS then executes the necessary OEM routine to place the target device into the proper state for remote manageability (step 910), reconfigures the PM1a and PM1b registers for ACPI operation (step 912), and then enters the S3 sleep state (step 914). The program code executed to configure a device (step 912 of FIG. 9) for remote manageability will vary from device to device (e.g., a NIC versus a modem), and will typically be embodied in OEM supplied BIOS instructions.

Figure 10:
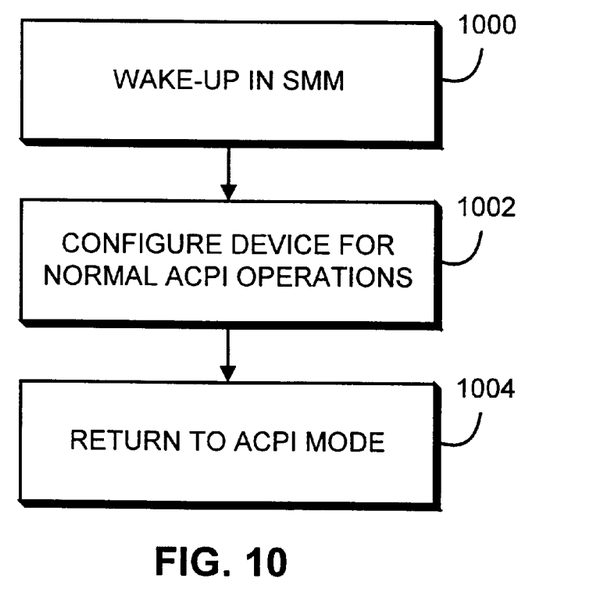
FIG. 10 shows a sleep-to-wake state transition method.

Referring to FIG. 10, transition from a sleep state to the working state $S_0$ is initiated when a WAK_STS flag (204 or 206) is set. As discussed above, a WAK_STS flag may be set by any event/device so enabled by the operating system such as a keyboard or a peripheral device like a modem or NIC. Setting a WAK_STS flag triggers generation of a SCI which causes computer system 400 to wake-up in SMM (step 1000). Once PU 402 resumes execution, BIOS configures the target device for normal waking state operations (step 1002). Upon completing device configuration, the ACPI operating system is notified of the change in WAK_STS state via a SCI. Following SCI generation, control is returned to the ACPI driver which performs its normal wake-up sequence (step 1004).

One benefit of the invention is that any device whose configuration requires computer system 400 to enter a sleep state can be accommodated. Another benefit is that the remote manageability configuration actions (steps 06 and 504) are transparent to the ACPI operating system.

The foregoing descriptions are illustrative only and are not to be considered limiting. Various changes in the materials, components, circuit elements, as well as in the details of the illustrated operational methods are possible without departing from the scope of the claims. For example, system bus 406 and secondary bus 410 can be proprietary or special purpose buses, peripheral component interface (PI) buses, industry standard architecture (ISA) buses, extended industry standard architecture (EISA) buses, or combinations of one or more of these busses. Further, the PM1b register set does not have to be implemented in hardware (the ACPI specification only requires PM1a registers be implemented in hardware). Thus, BIOS may create software PM1b registers (memory locations) which operate as described. Alternatively, either or both PM1a and PM1b registers can be implemented in discrete logic on a printed circuit card or incorporated within a specially designed application specific integrated circuit (ASIC). In addition, method steps of FIG. 8 may be performed in any sequence. Steps of the invention may be performed by a computer processor executing instructions organized into a program module or a custom designed state machine. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; and optical media such as D-ROM disks.

What is claimed is:

1. A method of initializing advanced configuration and power interface operating system data comprising:
    assigning a non-standard address to a first advanced configuration and power interface register;
    assigning a working code for all sleep states associated with the first advanced configuration and power interface register; and
    assigning a command port address to a second advanced configuration and power interface register.

2. The method of claim 1, wherein the first advanced configuration and power interface register comprises a PM1a_CNT register.

3. The method of claim 1, wherein the non-standard address comprises an address for a second advanced configuration and power interface register.

4. The method of claim 3, wherein the second advanced configuration and power interface register comprises a PM1b_CNT register.

5. The method of claim 1, wherein the working code corresponds to a S0 working state.

6. The method of claim 1, wherein the advanced configuration and power interface operating system data is initialized during a computer system start-up process and before an advanced configuration and power interface operating system has control of the computer system.

7. A method of configuring a device in a computer system that is transparent to an advanced configuration and power interface operating system, the method comprising:
    generating an interrupt when a sleep enable code is written to a first address;
    entering a non-ACPI mode in response to the interrupt;
    configuring the device; and
    transitioning the computer system into a sleep state while in the non-ACPI mode.

8. The method of claim 7, wherein the first address comprises an address for a system management interrupt command port.

9. The method of claim 7, wherein the non-ACPI mode comprises a system management mode.

10. The method of claim 9, wherein the interrupt comprises a system management interrupt.

11. The method of claim 7, wherein configuring is performed by a basic input-output system routine.

12. The method of claim 7 further comprising initializing advanced configuration and power interface operating system data during computer system start-up and before the advanced configuration and power interface operating system has control of the computer system.

13. The method of claim 12, wherein initializing comprises:

assigning a non-standard address to a first advanced configuration and power interface register;

assigning a working code for all sleep states associated with the first advanced configuration and power interface register; and assigning a command port address to a second advanced configuration and power interface register.

14. The method of claim 13, wherein the first advanced configuration and power interface register comprises a PM1a_CNT register.

15. The method of claim 13, wherein the non-standard address comprises an address for a second advanced configuration and power interface register.

16. The method of claim 15, wherein the second advanced configuration and power interface register comprises a PM1b_CNT register.

17. The method of claim 13, wherein the working code corresponds to a S0 working state.

18. A method of configuring a device in a computer system when a transition between power states is being effected by an advanced configuration and power interface operating system, comprising:

causing the computer system to enter a non-ACPI mode in response to the transition being effected;

configuring the device while in the non-ACPI mode; and completing the transition after the configuring of the device.

19. The method of claim 18, wherein the non-ACPI mode comprises a system management mode.

20. The method of claim 18, wherein the device comprises a network interface card.

21. A computer system comprising:

a bus;

a host processor operatively coupled to the bus;

an input-output device operatively coupled to the bus;

a memory operatively coupled to the bus and including instructions to transition the computer system between power states when said instructions are executed by an advanced configuration and power interface operating system, wherein said instructions include instructions to:

cause the computer system to enter a non-ACPI mode in response to the transition, configure the input-output device while in the non-ACPI mode, and complete the transition after the configuring of the input-output device.

22. The computer system of claim 21, wherein the instructions comprise basic input-output system instructions.

23. The computer system of claim 21, wherein the instructions initialize advanced configuration and power interface operating system data during computer system start-up and before an advanced configuration and power interface operating system has control of the computer system.

24. The computer system of claim 21, wherein the memory comprises nonvolatile memory.

25. The computer system of claim 24, wherein the memory comprises electrically erasable read only memory.

26. The computer system of claim 21, wherein the bus comprises a peripheral component interface bus.

27. The computer system of claim 21, wherein the input-output device comprises a network interface device.

28. The computer system of claim 21, wherein the input-output device comprises a modem.

29. The computer system of claim 21, further comprising:

a set of ACPI registers coupled to the bus;

wherein said set of registers includes:

a first advanced configuration and power interface register, wherein the first advanced configuration and power interface register comprises a PM1a_CNT register; and a second advanced configuration and power interface register.

30. The computer system of claim 29, wherein the first advanced configuration and power interface register has an assigned non-standard address, and wherein the non-standard address comprises an address for the second advanced configuration and power interface register.

31. The computer system of claim 30, wherein the second advanced configuration and power interface register comprises a PM1b_CNT register.

32. The computer system of claim 31, wherein the second advanced configuration and power interface register is a physical hardware register.

33. The computer system of claim 31, wherein the second advanced configuration and power interface register is not a physical hardware register.

34. The computer system of claim 29, wherein the first advanced configuration and power interface register has associated sleep states that are assigned a working code, said working code corresponding to a S0 working state.

35. The computer system of claim 29, wherein the first advanced configuration and power interface register is a physical hardware register.

36. A computer program for initializing advanced configuration and power interface operating system data, the computer program being stored on a media readable by a computer system and including instructions to:

assign a non-standard address to a first advanced configuration and power interface register;

assign a working code for all sleep states associated with the first advanced configuration and power interface register; and assign a command port address to a second advanced configuration and power interface register.

37. The computer system of claim 36, wherein the instructions are executed by the computer system during computer system start-up and before an advanced configuration and power interface operating system has control of the computer system.

38. The computer system of claim 36, wherein the media comprises nonvolatile memory.

39. The computer system of claim 38, wherein the memory comprises electrically erasable read only memory.

40. The computer system of claim 38, wherein the memory further comprises basic input-output system instructions.

41. The computer system of claim 36, wherein the first advanced configuration and power interface register comprises a PM1a_CNT register.

42. The computer system of claim 36, wherein the non-standard address comprises an address for a second advanced configuration and power interface register.

43. The computer program of 42, wherein the second advanced configuration and power interface register comprises a PM1b_CNT register.

44. The computer program of claim 36, wherein the working code corresponds to a S0 working state.

45. A computer program for configuring a device in a computer system when a transition between power states is being effected by an advanced configuration and power interface operating system, the computer program being stored on a media readable by the computer system and including instructions to:
   cause the computer system to enter a non-ACPI mode in response to the transition being effected,
   configure the device while in the non-ACPI mode, and
   complete the transition after the configuring of the input-output device.

46. The computer program of claim 45, wherein the non-ACPI mode comprises a system management mode.

47. The computer program of claim 45, wherein the device comprises a network interface card.

* * * * *